United States Patent [19]

Baggen

[11] Patent Number: 4,606,026

[45] Date of Patent: Aug. 12, 1986

[54] ERROR-CORRECTING METHOD AND APPARATUS FOR THE TRANSMISSION OF WORD-WISE ORGANIZED DATA

[75] Inventor: Constant P. M. J. Baggen, Eindhoven, Netherlands

[73] Assignee: U.S. Philips Corporation, New York, N.Y.

[21] Appl. No.: 573,522

[22] Filed: Jan. 24, 1984

[30] Foreign Application Priority Data

Jan. 25, 1983 [NL] Netherlands .......................... 8300249

[51] Int. Cl.⁴ ............................................ G06F 11/10
[52] U.S. Cl. ........................................ 371/39; 371/38
[58] Field of Search .......................... 371/37, 38, 39, 40

[56] References Cited

U.S. PATENT DOCUMENTS

| | | | |
|---|---|---|---|
| 4,206,440 | 6/1980 | Doi et al. ............................. | 371/39 |
| 4,413,340 | 11/1983 | Odaka et al. ........................ | 371/39 |
| 4,437,185 | 3/1984 | Sako et al. ........................... | 371/39 |
| 4,445,216 | 4/1984 | Kobari et al. ........................ | 371/39 |
| 4,477,903 | 10/1984 | Immink et al. ....................... | 371/37 |

*Primary Examiner*—Charles E. Atkinson
*Attorney, Agent, or Firm*—Thomas A. Briody; William J. Streeter; Marianne R. Rich

[57] ABSTRACT

A description is given of an error-correcting method for the transmission of word-wise organized data and devices for performing the method. The data words are group-wise received and some redundant words (114) of an error-detecting code are added to each group so that a first number of words is obtained, which is applied to a further encoder in two versions (118,121) having the same data content; these versions, however, are separated from one another in time over a given distance. Subsequently, a first series of check words of a first error-correcting code is added to a first group of words. The group of words and the associated check words are interleaved among as many second numbers of words. Subsequently, a second series of check words of a second error-correcting code is added to every second number of words. When the words are received from the medium, first the correction is performed by means of the two error-correcting codes and subsequently the two versions of the first numbers of words are combined again (95). The error-detecting code can thus make an optimum choice between the two versions. When use is made of a medium in the form of a disc which can be optically scanned, the entire information is applied thereto twice, an offset amounting to a fixed number of tracks being used betwen the first and the second time.

14 Claims, 5 Drawing Figures

ERROR-CORRECTING METHOD AND APPARATUS FOR THE TRANSMISSION OF WORD-WISE ORGANIZED DATA

BACKGROUND OF THE INVENTION

The invention relates to an error-correcting method for the transmission of word-wise organised data, comprising the following steps:

a. receiving a first number of data words in a first error encoder in order to add thereto a first series of check words on the basis of a first generator matrix of a first error-correcting code;

b. using delays which are all mutually different within each first number of data words and the associated first series of check words, interleaving sid first number of data words and said first series of check words among as many second numbers of words, said delays in sequence increasing by an interleaving increment;

c. receiving a second number of words in a second error encoder in order to add thereto a second series of check words on the basis of a second generator matrix of a second error-correcting code, thus forming a third number of words so that successive third numbers of words can be successively applied to a medium for transmission;

d. reproducing and, if possible and necessary, correcting reproducing of said second numbers of words after the transmission on the basis of the second parity check matrix associated with the second generator matrix;

e. reproducing and, if possible and necessary, correctively reproducing said first numbers of input words for supply to a user by the de-interleaving of said second numbers of words and on the basis of the first parity check matrix associated with the first generator matrix. A method of this kind is known from the previous Netherlands Patent Application 8102441 (PHQ 80.009) in the name of Applicant which is based on a Japanese Application 567608-80 by Sony Corporation, Shinagawa-ku, Tokyo, Japan. These correspond to U.S. Pat. No. 4,413,340. Instead of "word", the term "symbol" is also customarily used. Within each second number of words or within each third number of words, a limited number of words can be corrected or another number of words can be detected as being incorrect, said limited numbers being given by the minimum Hamming distance taken over the words. In this respect reference is also made to the previous Netherlands Patent Application 8200207 (PHN 10 242) in the name of Applicant which is incorporated herein by way of reference. The known method is especially intended for use in the digital recording of acoustic signals for HIFI reproduction. In given, rather exceptional cases the described error correction is not quite adequate. If no further steps were taken, an incorrect word would be converted into an audio signal which could cause a clock-like noise of arbitrary amplitude. In order to counteract this phenomenon, it has been proposed for audio applications to produce the audio signal in a different way when a non-correctable error is detected, for example by repeating the preceding audio signal (zero order interpolation), by muting the incorrect audio signal or by treating it in such a way that the disturbance is not at all or only hardly noticed by a listener. It is also possible to use a data transmission method of the described kind for non-audio information, such as text characters, computer data, programs for video games, and the like. For such applications it is important to supply the user only with data which has been found to be correct, if possible.

SUMMARY OF THE INVENTION

The object in accordance with the invention is achieved in that said first number of data words is formed in that a fifth number of (redundancy) words is added to a fourth, smaller number of user words by means of an error-detecting code, so that the first number equals the sum of the associated fourth number and fifth number, said first numbers of data words being applied to the first error correcting encoder in at least two corresponding versions with a relative delay between the versions in order to perform the mapping of the two versions, achieved by interleaving, on different frames on the medium, after the reproduction of two corresponding first numbers of data words their user words being made available together in an output device, a syndrome quantity being added to the relevant fourth number of user words by means of said error-detecting code, it being detected whether the syndrome quantity indicates "correct" or "incorrect" and when only one of the two corresponding fourth numbers of user words is indicated as being "correct", said only one fourth number of user words being applied to a user while the other fourth number of user words is inhibited. The invention is based on the idea that for many applications less data bits need be transmitted than the number which would correspond to the large amount of bits necessary to satisfy the requirements for HIFI audio reproduction. Therefore, it has been found that reducing the transmission capacity of a channel or the storage capacity of, for example an optically scanned memory disc to one half need not be objectionable. Strictly speaking, abandoning the "real time" character at the level of the decoding of a first number of data words is not objectionable either; the sequence thereof is in any case correctly maintained. The definition of a "frame" will be given hereinafter.

Preferably, said error-detecting code is a CRC-code. This is a known code having very attractice error-detecting properties.

Preferably, the fourth number of words amounts to 22 and the fifth number of words amounts to 2. The storage of data is thus compatible with the standard defined for the described storage of high quality audio information. The storage or transmission capacity of the medium thus amounts to only approximately 45% of that used for HIFI applications, but it has been found that in general this is amply sufficient.

The invention also relates to a device for performing the method, said medium being a memory disc which can be optically scanned along substantially concentric tracks and which can be driven at a substantially uniform speed of rotation per track. This results in an attractive implementation. Notably when the speed of rotation per track is the same, the accessibility in the case of jumps between different tracks is very fast, because it is not necessary to adapt the speed. On the other hand, it is also attractive when the medium is a data communication channel. This is also an attractive field of application.

The invention also relates to a receiving station for use in a device in which there is provided a clock regenerator for synchronisation data which is also received from the medium. This is an attractive implementation.

The invention also relates to a receiving station for use in a device in which the interleaving increment is equal to a number of n>1 frames, the relative delay amounting to a number of frames which is smaller than n. This is an implementation which requires only little storage capacity for achieving the relative delay but which already circumvents longer burst errors.

The invention also relates to a receiving station for use in a device in which the interleaving increment amounts to a number of n>1 frames, the relative delay amounting to a number between n and 2n frames. Slightly more storage capacity is then required, but the performance is also better.

The invention also relates to a receiving station for use in a device in which said relative delay is substantially at least equal to the dispersion introduced by the interleaving among the second numbers of words. The performance is thus highly improved.

Compensation of the delay introduced is preferably performed by means of a buffer having an input and an output which are each connected to a selection connection of a relevant selector switch, the other selection connections of the two selector switches being interconnected, the common connections of the selector switches forming the data input and output. This facilitates the control.

BRIEF DESCRIPTION OF THE FIGURES

The invention will be described in detail hereinafter with reference to some Figures.

DESCRIPTION OF THE PREFERRED EMBODIMENTS

The Encoding

Figure 1:
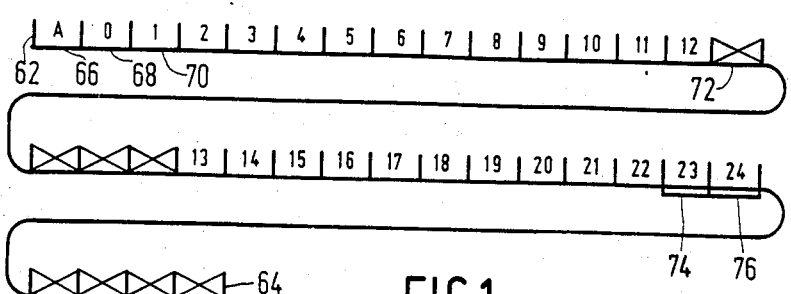
FIG. 1 shows a diagram of a configuration of the transmitted words.

FIG. 1 shows a preferred embodiment of the configuration of the words as presented to the medium, a so-called "frame". All operations in the encoder and the decoder are actually repeated with the recurrence period of the successive frames, so that the length of a frame also represents a time scale. A "frame" is to be understood to mean hereinafter the amount of data which is processed in a given sub-system in the period of time corresponding to the above length. Therefore, the operations in the devices are also synchronized by so-called "frame clock signals". The Figure shows a single group of words: actually these words are so-called channel words, i.e. data words which are configured by addition of redundancy so that they are more compatible with the transmission properties of a channel or the storage properties of a storage medium. Notably the coding is determined by the upper and lower limits imposed as regards the numbers of successive zeroes and ones. This so-called modulation coding is not directly relevant for the present invention and will not be elaborated herein. Between every two words thus modulated there are inserted three spacing bits which also comply with said upper and lower limits. Within the frame, after the beginning, first a synchronization word A (66) is presented at the indication 62 and subsequently a control word whose content is not shown but which is symbolised by "0" (68). Upon reception of the data, the synchronization word A produces the so-called "frame clock"; the control word can be used for a variety of signal codes; this will not be elaborated herein. The synchronization word as well as the control word are ignored for the error-correcting codes of the present invention.

The further words are organised by means of systematic error-correcting codes. At the level of these error-correcting codes there are 24 non-redundant words (1-24), for example as denoted by the indicator 70, and eight check words which are denoted by a cross, for example the word 72. The frame ends at the indication 64 and a new frame commences. The meandered line indicates that these words are contiguous.

Figure 2:
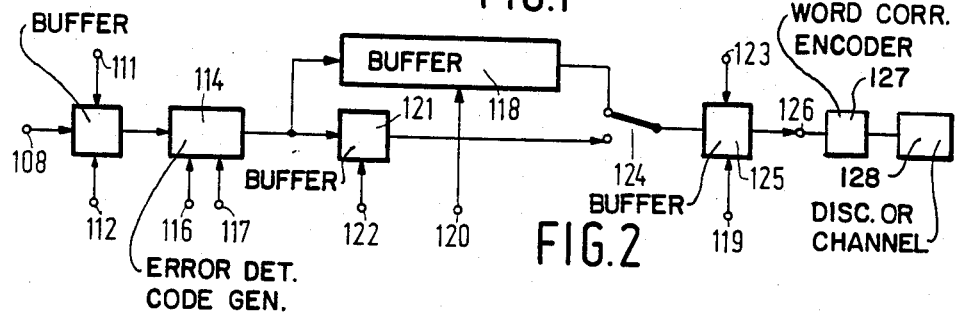
FIG. 2 shows a diagram of an encoder.

FIG. 2 shows a very simple block diagram of an encoder. The user words appear bit-serially on input 108. Element 110 is a data buffer which serves to compensate for any discrepancies between the supply of data bits and the speed at which they are processed in the remainder of the circuit. In given circumstances this buffer may be a known first-in-first-out (FIFO) buffer. An input 111 of this buffer receives clock pulses from the data source in order to control the taking up of data pulses and its input 112 receives clock pulses in order to control the output of data pulses. The data input may alternatively be byte-serial. In that case the element 110 also comprises a parallel/series converter which will not be elaborated herein. Element 114 is a generator for an error-detecting code which will be described in detail with reference to FIG. 3. In the present example each time 22 8-bit user words are supplied, two redundant words being added to these 22 words. To this end, directly after reception from the element 110 the 22 data words are output again on the output of the element 114, so for a period of time which corresponds to $22 \times 8$ data bits from the element 110. On its input 116 the code generator 114 subsequently receives 16 additional clock pulses while no new data bits are presented to the code generator. For each of these 16 clock pulses 1 redundant bit is output. After the output of the 16 redundant bits, the code generator receives a reset pulse on its input 117, said reset pulse being derived, for example from a clock pulse counter (not shown), so that the circuit 114 is now ready to receive the next 22 words. To the output of the element 114 there is connected a mechanism for applying each group of 24 words on the output 126 twice to the error encoder of the error-correcting code. To this end, the output of the element 114 is directly connected to two parallel-connected serial buffers 118, 121. These buffers are constructed, for example as shift registers. Random access memories can also be used, but their use is not elaborated herein. The serial buffer 121 has a capacity of 1 frame. The serial buffer 118 has a capacity of "x" frames, so for "x" (24) (8) bits. As will be described hereinafter, "x" equals 3 in the preferred embodiment. Other values, larger as well as smaller, may alternatively be used. The outputs of the two serial buffers are connected to the two selection connections of the selector switch 124. The function of element 125 corresponds to that of the element 110; it serves to adapt the input rate and the output rate of the data bits therein; element 125 is traversed not only by the user bits but also by the redundant bits. The output data bits appear on an output 126 in order to be applied to the encoder for the word-correcting code as described in the above-mentioned publications.

The procedure is as follows. When a first frame is received, the serial buffers 118 and 121 are filled together. The selector switch 124 is then it its upper position, so that the buffer 118 receives as well as outputs a frame. Consequently, clock pulses are then received on the inputs 120 and 122. Subsequently, the switch 124 is set to its lower position so that only the buffer 121 receives clock pulses in order to output the frame just received. Subsequently, the next frame is received from the element 114, the selector switch 124 again being in its upper position. The clock pulses on the inputs 119 and 123 control the data input and output in the element 125. It is to be noted that the data flow through the element 125 is twice as large as the data flow on the output of the element 114, so that the mean clock pulse frequencies should also be twice as high. In given circumstances it is advantageous to distinguish the first and the second version of a group of 24 words as such by special information, for example by a special content of said control word. A synchronization of this kind may also be implemented at a higher level, for example by including specific starting information per concentric track.

Figure 3:
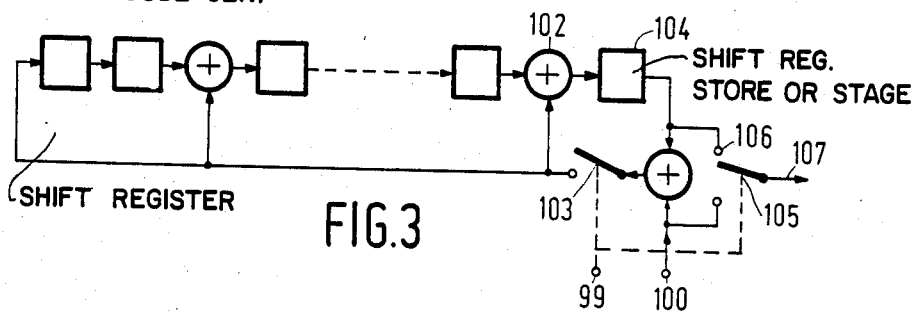
FIG. 3 shows an example of the formation of an error-detecting code.

FIG. 3 shows an example of the formation of an error-detecting code in accordance with this so-called CRC principle. The code generator 114 of FIG. 2 may be constructed, for example by means of a CRC generator/checker module 9401, make Fairchild Corporation and included in the TTL MACROLOGIC series of modules. The code is based on a generator polynomial, one of which is implemented in FIG. 3. The relevant polynomila is $x^{16}+x^{15}+x^2+1$; however, this is only one of many possibilities. The generator shown consists of 16 shift register positions, such as the element 104, each of which is capable of storing 1 bit. The dotted line represents a series consisting of the other positions which are not shown. Via a number of branches of this shift register and three EXCLUSIVe-OR-gates, such as the element 102, a sixteen-bit series is formed which can be made available, if desired, on an output 106. Also provided is a bypass, so that the data bits received in the lower position can alternatively be output directly on the output 107 by means of the switch 105. The switch 103 is then also in its lower (closed) position. The switches 103 and 105 are operated together by a control signal on the input 99. When all data bits on which the error-detecting code is to act have been received on the input 100, the switch 105 is set to its upper position and the switch 103 is set to its interrupting position, so that the redundant bit series can be derived from the output 107. Generally speaking, the sixteen-bit redundant series thus formed can have 65k different values, but only one thereof corresponds to the correct data content of the associated non-redundant words. Should an error have occurred, in first instance all contents of the redundant series will be equally probable so that there is a very small risk that the error is neglected. A related aspect is the very high capability of such a CRC-code for the detection of a random error. For the correction of errors, however, such a CRC-code is not useful.

The Decoding

Figure 5:
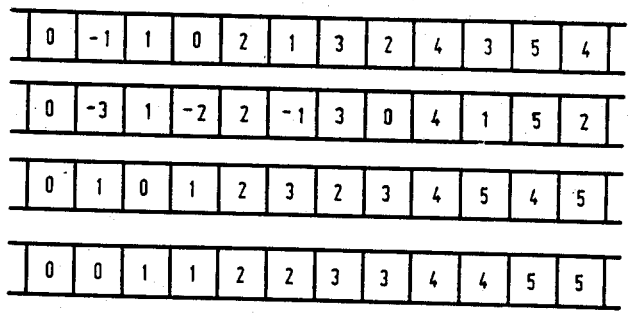
FIGS. 5a-5f show different implementations for the introduction of the relative delays.
Figure 4:
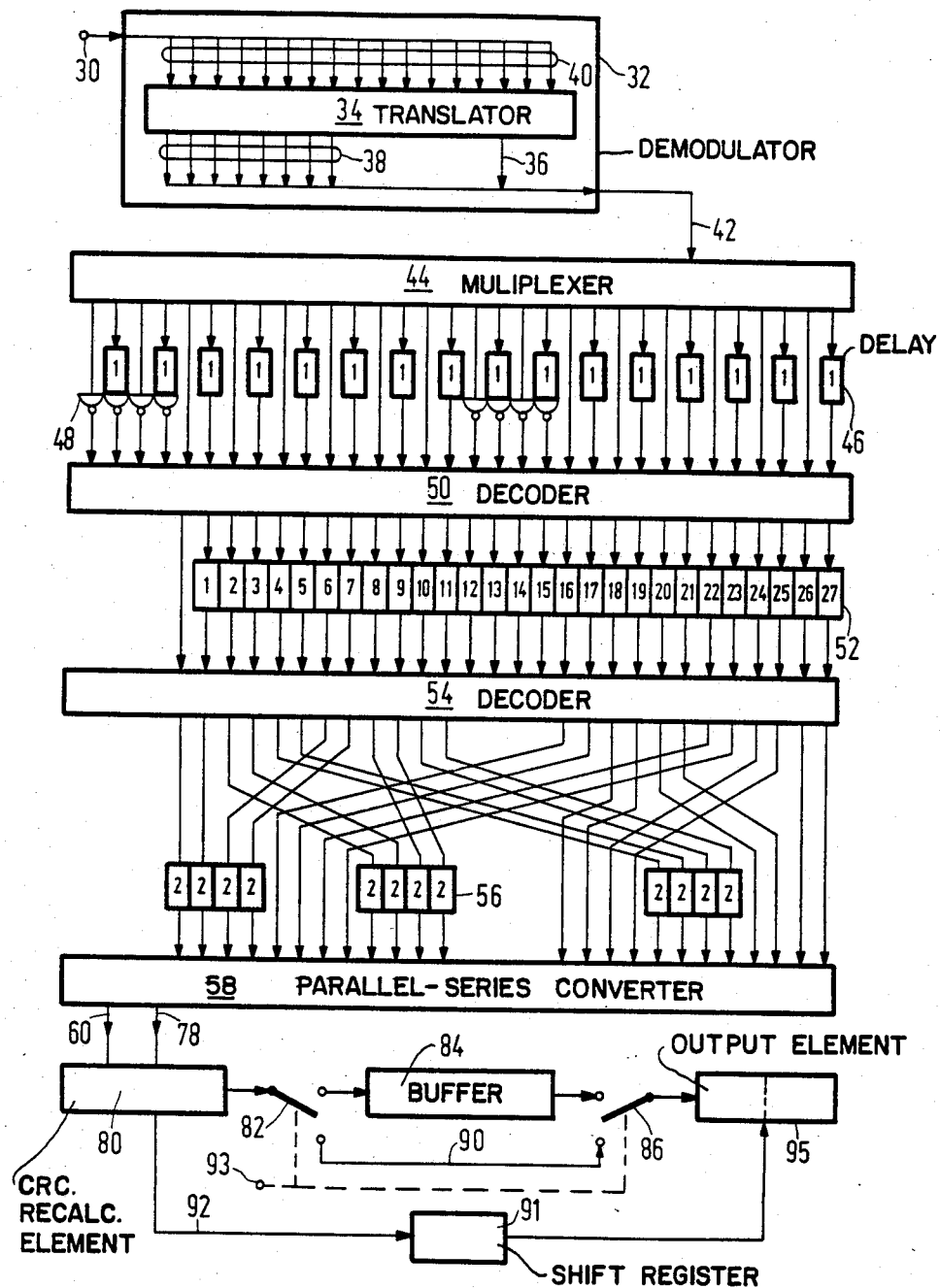
FIG. 4 shows a more elaborate diagram of a decoder.

FIG. 4 shows a complete representation of a decoding device for use in accordance with the invention. The organisation of the two versions with the relative delay therebetween is shown in FIG. 5a. Each user frame is applied twice to the error encoder. Each version is indicated by a block provided with a rank number within the series of user frames; consequently, these are integers. In this case a relative delay of three frames is introduced between two successive versions.

The parts of the encoder which relate to the word-correcting code are the inverse of the relevant elements of the decoder and will not be elaborated herein for the sake of simplicity; the same is applicable to the modulation for adaptation to the channel properties. The data of the channel words arrives bit-serially on an input 30. In a demodulator 32 first a series/parallel conversion takes place, so that a complete 14-bit channel word appears on the fourteen-fold connection 40. The spacing bits between successive channel words are ignored in this context. Block 34 represents a translation element which converts a correctly received 14-bit channel word into the corresponding 8-bit code symbol and which possibly outputs a flag bit on output 36 when an impermissible channel word is received. The connection 42 is represented as a single line for the sake of simplicity. Block 44 represents demultiplexer which comprises one input and 32 parallel outputs. Multiplexing is word-wise performed, so that each output receives its own complete symbol or word. The blocks denoted by the reference "1", for example the block 46, delay the words applied thereto by a time interval which corresponds to the period during which exactly 32 words arrive on the connection 42 (so by 1 frame). Elements such as the element 48 are inverters which invert the check words of the second error-correcting code. Element 50 is the reproduction and correction element for the second error-correcting code in which the parity check matrix applicable to this code is implemented. Using four redundant words, for example two incorrect words can be corrected without it being necessary to know in advance the location where these incorrect words are situated. When use is made of the flag bits, the correction capability is even increased. The procedure during decoding will not be elaborated for the sake of brevity. Thus, for every 32 words received from the element 44 28 eight-bit output words (symbols) appear on the output of the element 50, provided with a flag bit or not, a flag bit being present if correction proved to be impossible due to an excessively large number of errors or if the result was considered unreliable. The blocks 52, denoted by the reference numerals 1 through 27, delay the words received in order to perform deinterleaving. A "1" in a block indicates a delay by a period of time which corresponds to the output of four groups of 28 words (symbols) by the element 50. An indication "14" represents a period of time which corresponds to the output of (14) (4) of such successive groups of 28 words. The difference between successive delay times during this interleaving, the so-called interleaving increment, thus equals four frames in this case. In principle other values can also be used for the interleaving increment. Each word of a group of 28 words output together by the element 50 is this assigned to a relevant newly formed group of 28 words. The effect of a burst error is thus spread over a large time interval so that, generally speaking, each newly formed group of 28 words will contain no more than a small number of incorrect words.

Element 54 is the reproduction and correction element associated with the first word-correcting code. Again there are four redundant words, so that two words can be corrected without their location having to be known in advance. If one or more words is provided with a flag bit, the correction capability is larger accordingly, because the location of an error is thus indicated. Thus, for every group of 28 words received in the reproduction and correction element 54 a number of 24 words appears on the output of this element. Blocks which are denoted by a reference "2", for example the block 56, delay the words applied thereto by a time interval which corresponds to the period during which exactly (2) (32) words arrive on the connection 42. Element 58 is a parallel/series converter for outputting 24 words received on the output 60 in the correct sequence. In addition, a flag bit may be received on the line 78 signifying reliable or unreliable error correction.

The two redundant bytes of the CRC-code are recalculated in an element 80. This can be performed by means of a component similar to that originally used for generating these two redundant bytes. The two newly calculated redundant bytes are now added bitwise modulo-2 to the two redundant bytes received from the medium, so that two syndrome bytes are formed. Subsequently, the bit-wise INCLUSIVE-OR function of the two syndrome bytes is formed, so that a bivalent syndrome quantity is obtained. This quantity has the value zero only if the two pairs of redundant bytes completely corresponded; in all other cases the INCLUSIVE-OR function has the value 1. In the stream of bits received, alternately a frame is received which has been delayed by a comparatively long period of time by the serial buffer 118 in FIG. 2 and a frame which has been delayed by only a comparatively short period of time by the serial buffer 121. This may be indicated for each frame by a separate control data which thus has the value "delayed" or "not (or little) delayed". A further possibility consists in that the switch assumes the correct position in an initial situation, its position being changed every frame. This is very well possible because of the cyclic configuration of the sequence shown in FIG. 5a. When such a frame which has hardly been delayed is received, the selector switches 82, 86 are in their upper position and the serial buffer 84 receives shift pulses on a clock pulse input (now shown). However, when a frame is received which has been delayed by a comparatively long period of time, the selector switches 82, 86 are in their lower position and the serial buffer 84 does not receive shift pulses. The positions of the selector switches 82, 86 are controlled together by a signal on an input 93 which indicates whether or not the relevant frame has been delayed. A further possibility consists in that the frame clock pulses switch over a flip-flop; this is because the class of the even frames is always delayed by a comparatively large amount, while the class of the odd frames is always delayed by a comparatively small amount. The length of the serial buffer 118 corresponds to two frames so that the two corresponding versions of a first group of data words are presented to the output element 95 in direct succession, and it is also known which of the two versions is reliable. Generally, both versions will be reliable and an arbitrary one of the versions can be applied to the user. Should only one of the two versions be reliable, the reliable one will be applied to the user. When both versions are unreliable, no correct decision can be taken at this level. The selection from the two versions is controlled by the result of the described INCLUSIVE-OR function which appears on the line 92 and which is, therefore, buffered in a shift register 91 during the reception of a number of successive frames. The output element 95 is, for example a serial buffer having a capacity amounting to two times 24 bytes. Thanks to the signal received from the shift register 91 it is known whether the first frame received is correct, so that the correct frame can be selected in the buffer 95. If the first frame is not correct, the signal on line 92 at that instant indicates whether the second frame is correct; the latter signal may also be applied to the output element 95 for control purposes.

FIGS. 5a–5f show some implementations for the introduction of the relative delays between the two versions of a user frame. In FIG. 5a each version is applied twice (to element 125 in FIG. 2) with a relative delay of three frames. The construction is thus completely cyclical; alternately a delayed and non-delayed frame are applied. This simplifies the control. FIG. 5b shows a variation of FIG. 5a. The relative delay therein equals 7 frames, so that the storage capacity of, for example the buffer 118 must be larger. However, control is again simple because alternately a delayed and a non-delayed frame arrive. The interleaving increment amounts to four frames so that in principle any relative delay which is not equal to a multiple of four can be correctly used. It has been found that longer burst errors are thus permissible than if no use were made of the double supply with an error-detecting code as described. FIG. 5c shows a version in which the relative delay equals two frames. On the one hand this requires less buffer capacity than the solution shown in FIG. 5a. On the other hand the control is slightly more complex because no cyclic configuration is formed. Now each time two delayed frames arrive and two non-delayed frames. It is a further drawback of this implementation that the delay elements 56 of FIG. 4 must be omitted, because they would cause mapping of parts of a user frame in the same frame on the medium. This problem does not occur in the case of a relative delay amounting to an odd number of frames. FIG. 5d shows a solution where two user frames are presented in direct succession. Notably the decoder is thus simplified, because the serial buffer 84 and the selector switches 82, 86 may be omitted. On the other hand, the control is again not cyclical.

FIG. 5e shows an implementation in which each user frame is applied to the error encoder three times and in which cyclic control can still be used. Evidently, the circuit is more complex but in some cases an improved performance is achieved. FIG. 5f shows an implementation in which each user frame is applied to the error encoder four times and completely cyclic control remains possible. It will be evident that in comparison with previous solutions the storage capacity and the transmission capacity of the medium are reduced in the implementation shown in the FIGS. 5e/f. In some circumstances it is advantageous to choose a relative delay in the same order of magnitude as the spread introduced by interleaving. In the example shown, this amounts to $4 \times 27 = 108$ frames. Depending on the type of bursts to be treated, the relative delay will also be chosen in this range; it holds good that any increase of the relative delay also mitigates longer burst errors, be it that each time larger buffers will be required. The relative delay will then be chosen to be larger than, for example 110 frames.

The reliability can be further enhanced, notably when use is made of an optically scanned disc for data storage, by performing the described procedures within a track, each version of the data thus being derived twice from the decoder of the error-correcting code. Moreover, the data of each track is stored again on a second track, a fixed distance being present between such track pairs which contain the same data; said distance is measured, for example as the difference between the track numbers. If the detection indicates that both versions in the output element 95 of FIG. 4 are unreliable, the read mechanism of the optically readable disc should address the substitute track.

What is claimed is:

1. Method for encoding word-wise organised data, comprising the steps of:
   receiving a stream of user words of fixed lengths and generating therefrom successive groups of data words each group comprising a first number of user words and a second number of redundancy words according to an error detecting code;
   replicating each of said first groups of data words a predetermined number of times thereby producing a plurality of corresponding versions of each of said first groups of data words;
   creating respective delay times between respective corresponding versions, and reconstituting a serial stream of all first groups of data words so formed;
   adding a first series of check words on the basis of a first error correcting code to said first groups of data words;
   interleaving said first groups of data words and said first series of check words using mutually different delays, said delays having respective values differing by an interleaving increment, thereby generating second groups of words,
   adding a second series of check words to said second groups of words on the basis of a second word error correcting code, thereby forming third groups of words having a recurrence period representing a frame; and wherein said respective delay times and said interleaving increment cause different versions of said data words to be mapped on different frames.

2. A method as claimed in claim 1, wherein said error-detecting code is a CRC-code.

3. A method as claimed in claim 1, wherein said sequence of user words comprises twenty-two words and said series of redundancy words comprises two redundancy words.

4. Method for decoding a sequence of received encoded groups of data words created from a stream of user words of fixed length by adding a second number of redundancy words to a first numbers of user words in accordance with an error detecting code, replicating each of said first groups of data words a predetermined number of times thereby producing a plurality of corresponding versions of said first groups of data words, creating a delay time between respective corresponding versions, adding a first series of check words in accordance with a first error correcting code to said first groups of data words, interposing delays having respective values differing by an interleaving increment within each of said groups of data words and associated first series of check words, thereby forming second groups of words, adding a second series of check words according to a second word correcting code to said second groups of words thereby creating said encoded data words, said decoding method comprising the steps of
   decoding said received encoded data words in accordance with said second error correction code, thereby creating decoded second groups of words;
   de-interleaving said second groups of words and error correction decoding the so de-interleaved words thereby creating a sequence of decoded first groups of data words and corresponding versions thereof;
   calculating syndromes indicating a "correct" version or an "incorrect" version for each of said decoded first groups and corresponding versions; and
   outputting said "correct" version in the presence of an incorrect and a correct version.

5. A method as claimed in claim 4, wherein said error detecting code is a CRC code.

6. A method as claimed in claim 5, wherein said sequence of user words comprises twenty-two words and said series of redundancy words comprises two redundancy words.

7. Error protection encoding apparatus for the transmission of word-wise organized data, comprising:
   receiving means for receiving a stream of user words of fixed lengths and therefrom generating successive first groups of data words by complementing a first number of user words with a second number of redundancy words according to a predetermined error-detecting code;
   replicating means coupled to said receiving means for replicating each of said first groups of data words a predetermined number of times, thereby producing plural corresponding versions of each of said first groups of data words;
   first delay means coupled to said replicating means for imparting respective delay times between respective corresponding versions, and reconstituting a serial stream of first groups of data words so formed;
   first error encoder means coupled to said delay means for receiving said first groups of data words and adding thereto a first series of check words on the basis of a first word-error correcting code;
   said delay means coupled to said first error encoder means for delaying respective first groups of data words and checks words by delays having respective values that step by an interleaving increment thereby creating second groups of data words;
   second error encoder means coupled to said second delay means for receiving said second groups of data words and adding thereto a second series of check words on the basis of a second word-error correcting code, to form a third groups of words for outputting to a medium, said third groups of data words having a recurrence period constituting a frame;
   and wherein said respective delay times and said interleaving increment have such values that different versions of one data word group are mapped on different frames in said medium.

8. Apparatus as claimed in claim 7, wherein said medium is a memory disc having substantially concentric tracks rotating at a substantially uniform rotational speed.

9. Apparatus as claimed in claim 7, wherein said medium is a data communication channel.

10. Device for decoding received word-wise encoded data comprising,
    first decoding means for decoding said received data in accordance with a second error correcting code thereby creating first decoded data word groups;
    de-interleaving means connected to said first error correction decoding means for creating de-interleaved data from said first decoded data word groups;

said decoding means connected to said the interleaving means for decoding said de-interleaved data in accordance with a first error correcting code, thereby creating second decoded data word groups including a first version and a replicated version of each of said second decoded data word groups, an encoding delay existing between said first and replicated versions;

delay means connected to said second error correcting decoding means for delaying said first version or said replicated version to eliminate said delay therebetween;

error detecting decoding means connected to said second decoding means for generating a "correct" or "incorrect" detection signal for said first and replicated versions; and output means connected to said delay means and having a control input for receiving said detection signal for selecting said first or said replicated version under control of said detection signal.

11. Apparatus as claimed in claim 10, wherein said medium is a memory disc.

12. Apparatus as claimed in claim 10, wherein said interleaving increment is equal to n frames, where n is greater than 1; and wherein said delay means delays said replicated version by a number of frames less than n.

13. Apparatus as claimed in claim 10, wherein said interleaving means interleaves said first error detecting sequence by an interleaving increment equal to a number of frames n greater than 1, and wherein said delay means delays said replicated version by a number of frames equal to n to 2n.

14. A device as claimed in claim 10, wherein said error detection means is a CRC error detection means for generating a syndrome quantity.

* * * * *

UNITED STATES PATENT AND TRADEMARK OFFICE
CERTIFICATE OF CORRECTION

PATENT NO. : 4,606,026

DATED : August 12, 1986

INVENTOR(S) : Constant P.M.J. Baggen

It is certified that error appears in the above-identified patent and that said Letters Patent is hereby corrected as shown below: On the title page Section [54] Delete "AND APPARATUS"

Claim 7, Col. 10 Line 39 change "said" (first occurrence) to --second--.

Signed and Sealed this

Sixth Day of December, 1988

Attest:

DONALD J. QUIGG

Attesting Officer

Commissioner of Patents and Trademarks